US012669173B2

(12) United States Patent (10) Patent No.: US 12,669,173 B2
Turek et al. (45) Date of Patent: Jun. 30, 2026

(54) EPICYCLIC GEAR ASSEMBLY PLANETARY GEAR CARRIER

(71) Applicant: HAMILTON SUNDSTRAND CORPORATION, Charlotte, NC (US)

(72) Inventors: Łukasz Turek, Wrocław (PL); Jonathan Darby, Newcastle (GB); Paweł Aleksander Chmielewski, Jelenia Góra (PL); Stephen Harlow Davies, Shrewsbury (GB)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 19/091,532

(22) Filed: Mar. 26, 2025

(65) Prior Publication Data

US 2025/0347341 A1 Nov. 13, 2025

(30) Foreign Application Priority Data

May 8, 2024 (EP) .................................... 24461568

(51) Int. Cl.
*F16H 57/08* (2006.01)
*F16H 1/28* (2006.01)
*F16H 57/028* (2012.01)
(52) U.S. Cl.
CPC ......... *F16H 57/082* (2013.01); *F16H 1/2836* (2013.01); *F16H 57/028* (2013.01)
(58) Field of Classification Search
CPC .......... F16H 1/28; F16H 1/2836; F16H 57/08; F16H 57/082
See application file for complete search history.

(56) References Cited

U.S. PATENT DOCUMENTS 3,345,947 A * 10/1967 Combourieux ......... F42C 19/02
102/248
8,172,717 B2 5/2012 Lopez et al.
(Continued)

FOREIGN PATENT DOCUMENTS

EP 2532919 A2 12/2012
JP S63231036 A 9/1988
(Continued)

OTHER PUBLICATIONS

Extended European Search Report dated Jul. 15, 2024, for corresponding European Patent Application No. 24461568.8, 7 pgs.

*Primary Examiner* — Ernesto A Suarez
*Assistant Examiner* — Lillian T Nguyen
(74) *Attorney, Agent, or Firm* — Kinney & Lange, P.A.

(57) ABSTRACT

A planetary gear carrier assembly includes a plurality of planetary gears each rotatable about a respective planet axis defined by a respective pin through the gear, and a planetary gear carrier defining an annular housing having a front face and a back face defining a housing therebetween and an annulus axis. The planetary gears are located within and spaced circumferentially around the housing. A position balancing arrangement is provided for at least one of the plurality of planetary gears, including a slot formed in the front face and back face, extending circumferentially, to receive the pin of the respective at least one of the planetary gears for circumferential movement within the slot, and a resilient element in biased engagement with the pin to adjust the position of the pin in the slot towards a desired position responsive to movement of the pin away from the desired position in the slot.

20 Claims, 7 Drawing Sheets

(56)          References Cited

U.S. PATENT DOCUMENTS

| | | | |
|---|---|---|---|
| 8,550,957 B2 | 10/2013 | Erno et al. | |
| 11,760,235 B2 | 9/2023 | Albert et al. | |
| 11,852,053 B2 | 12/2023 | Mccloy et al. | |
| 2004/0198548 A1* | 10/2004 | Showalter | F16D 23/06 |
| | | | 192/53.31 |
| 2012/0316027 A1* | 12/2012 | Erno | F16H 57/082 |
| | | | 475/331 |
| 2016/0348760 A1* | 12/2016 | Wigsten | F01L 1/352 |
| 2024/0068557 A1 | 2/2024 | Ciciriello | |

FOREIGN PATENT DOCUMENTS

| | | |
|---|---|---|
| JP | H08170695 A | 7/1996 |
| WO | 2013083188 A1 | 6/2013 |

\* cited by examiner

EPICYCLIC GEAR ASSEMBLY PLANETARY GEAR CARRIER

CROSS-REFERENCE TO RELATED APPLICATION(S)

The present application claims priority to European Patent Application No. 24461568.8 filed on May 8, 2024, the contents of which are incorporated by reference herein in its entirety.

TECHNICAL FIELD

The present disclosure relates to epicyclic gear assemblies and, more particularly, to a carrier for planetary gears of an epicyclic gear assembly.

BACKGROUND

Many transmission systems use epicyclic gear assemblies to transmit torque from an input side to an output side. An epicyclic gear assembly typically comprises an input shaft that rotates a central, or sun gear, about an axis. A number of planetary gears are mounted around the sun gear for toothed engagement with the sun gear and earth ring. As the sun gear rotates around its axis, it causes the planetary gears to rotate around their own axis. The gear ratio of the system is determined by the arrangement and sizes of the gears. The planetary gears are typically supported relative to the sun gear in a planetary carrier.

An advantage of such epicyclic or planetary transmissions is that input torque is split into a number of parallel paths. For a planetary system having n planetary gears, each sun-planet path is designed to carry 1/n of the input torque. In an ideal system, each planet is equally loaded. In practice, however, the load will be unequally shared between the planetary gears due to misalignments arising from e.g. manufacturing, material or assembly errors/tolerances. This means that one or more planets may carry a greater load than others which can have serious implications on operation and reliability of the assembly and affect e.g. gear system sizing, tolerance schemes and torque ratings in unpredicted ways. These load differences increase with increasing numbers of planetary gears.

There is, therefore, a need for an assembly that improves load distribution between planetary gears for an epicyclic gear system, preferably for any number of planetary gears.

SUMMARY

According to one aspect, there is provided a planetary gear carrier assembly comprising: a plurality of planetary gears each rotatable about a respective planet axis defined by a respective pin P' through the gear; a planetary gear carrier defining an annular housing having a front face and a back face defining a housing therebetween and an annulus axis A, wherein the plurality of planetary gears are located within and spaced circumferentially around the housing, the pin of each planetary gear passing from the front to the back face at a location such that the planetary gear partially extends radially outwards of the carrier periphery; the assembly comprising a position balancing arrangement for at least one of the plurality of planetary gears, the position balancing arrangement comprising: a slot formed in the carrier front and back face, extending circumferentially, to receive the pin of the respective at least one of the planetary gears for circumferential movement within the slot; and a resilient element in biased engagement with the pin to adjust the position of the pin in the slot towards a desired position responsive to movement of the pin away from the desired position in the slot.

According to another aspect, there is provided an epicyclic gear assembly including such a carrier assembly.

BRIEF DESCRIPTION

Examples of the planetary gear carrier and the epicyclic gear assembly will now be described with reference to the drawings. It should be noted that these are examples only and variations are possible within the scope of the claims.

DETAILED DESCRIPTION

Figure 1:
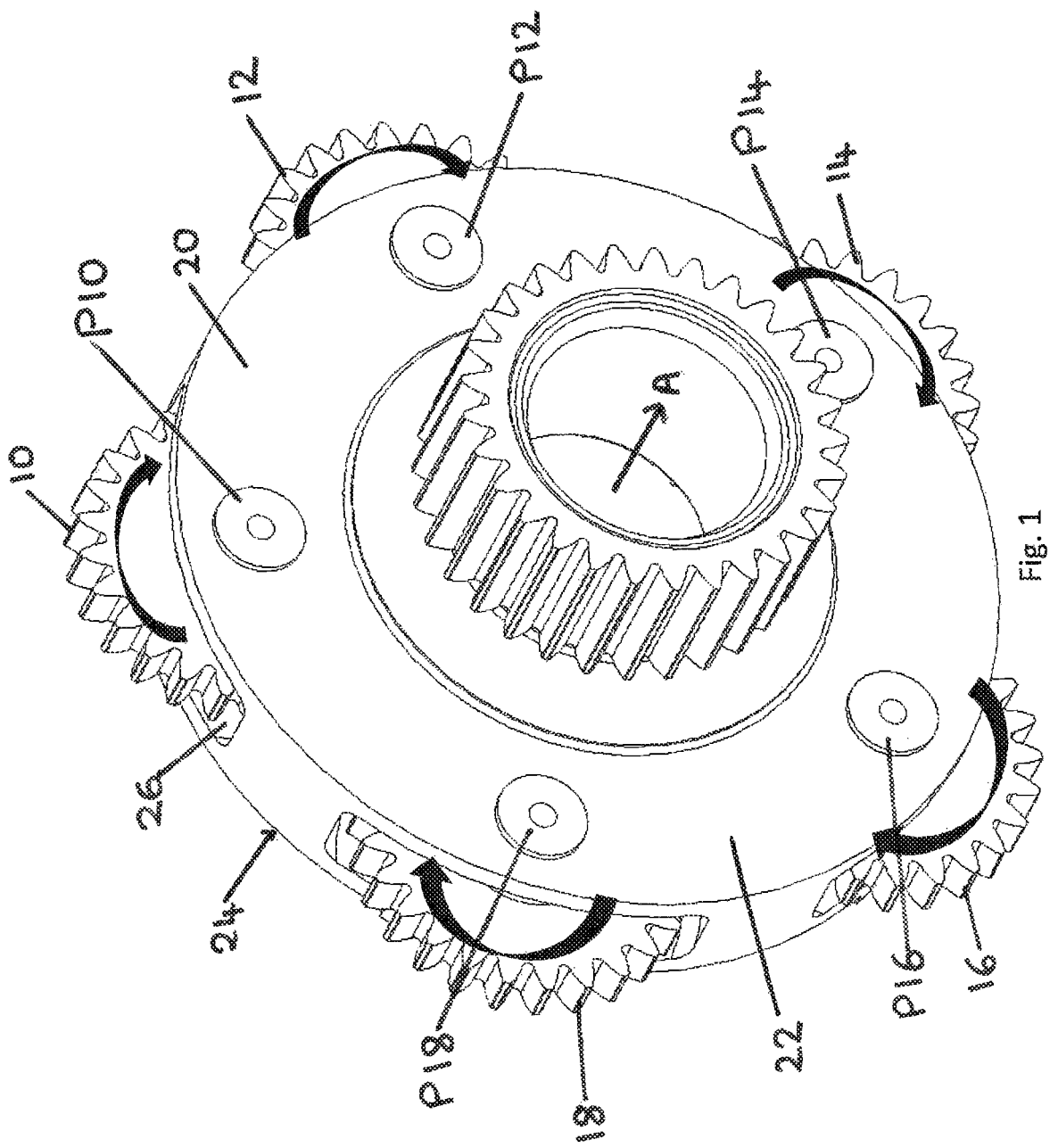
FIG. 1 shows an example of a conventional planetary gear carrier.

FIG. 1 shows, by way of background, a set of planetary gears 10, 12, 14, 16, 18 of an epicyclic transmission assembly. The drawing shows the input shaft, the rotation of which is transmitted to an output via the transmission assembly according to a gear ratio defined by the transmission assembly. The transmission assembly includes a sun gear 1, that is located within the carrier envelope. The sun gear is coaxial with the input shaft and so rotation of the input shaft about its axis A causes corresponding rotation of the sun gear.

The transmission assembly further comprises the plurality of planetary gears 10, 12, 14, 16, 18 that are located around the sun gear and arranged to be in toothed engagement with the sun gear such that as the sun gear rotates about its axis A, it meshes with the planetary gears causing them to rotate (typically in the opposite direction of rotation) each about their own axes P10, P12, P14, P16, P18. The example shown has five planetary gears, but other numbers of planets are also possible as is known in the art.

The planetary gears 10, 12, 14, 16, 18 are mounted to be properly located relative to the sun gear by being accommodated in and supported by a carrier 20. The carrier 20 may be in the form of an annular housing, mounted about, and coaxially with, the sun gear and the input shaft. In the example shown, the carrier 20 may have a front face 22 and a rear face 24 assembled together to define a cavity 26 therebetween to receive the planetary gears. Each planetary gear is secured to the carrier 20 by means of a pin forming the axis of rotation P10, P12, P14, P16, P18 of the planetary gear, the pin extending from the carrier front face to the rear face via the respective planet 10, 12, 14, 16, 18. The carrier, the pins and the planets are arranged such that each planet is able to rotate about its own axis P10, P12, P14, P16, P18 between the carrier faces 22, 24. The location of the pins is such that the planets extend beyond the periphery of the carrier such that they are able to mesh with an output gear to provide the transmitted output.

As mentioned above, in an ideal case, the load or torque from the input shaft, via the sun gear, would be equally distributed across the planetary gears, but in reality, e.g. to misalignments due to manufacturing/material or assembly errors, the load will be unevenly distributed and one or some planets will carry a greater load than others. In addition, variations in temperature may cause uneven expansion of the gear material, also resulting in uneven load distribution.

The assembly according to this disclosure introduces compliance into the carrier assembly to compensate for, and correct for uneven loading across the planetary gears.

This will be explained with reference to two examples, as shown in FIGS. 2 to 8, but other examples are also possible within the scope of the claims.

According to the solution, compliance is added to the carrier 20', 200, by means of a resilient element 40, 400 mounted around the axis pin P' of one or more of the planetary gears 100, 120, 140, 160, 180. The resilient element acts to centre the pin and, hence, the planetary gear, with respect to a predetermined location in the carrier.

In the examples shown, a slot 30, 300 is provided in the carrier 20', 200, within which the axis pin P' of a respective planetary gear 100, 120, 140, 160, 180 is located. The slot 30, 300 may extend circumferentially with respect to the carrier. In the example shown, for each planetary gear 100, 120, 140, 160, 180 the slot 30, 300 is provided on either side of the gear i.e. in the front and rear faces 22', 24' of the housing and is configured such that the pin P' of the respective planetary gear is positioned substantially in the centre of the slot when the load on that planetary gear is equal to 1/n of the total load for an assembly with n planetary gears—i.e. in the ideal state of even load distribution between the planetary gears. Thus, this central location of the pin P' in the slot 30, 300 is the desired position to correctly position the respective planetary gear in a balanced assembly. In the example shown, such a slot is provided for each planetary gear, although it is envisaged that fewer than all planetary gears may be provided with a balancing arrangement of resilient element and slot.

A resilient element 40, 400 is provided for each planetary gear having such a slot, the resilient element configured to locate the pin P' centrally (or at the desired position, which may, in some cases, be an off-centre position) in the slot 30, 300.

Figure 2:
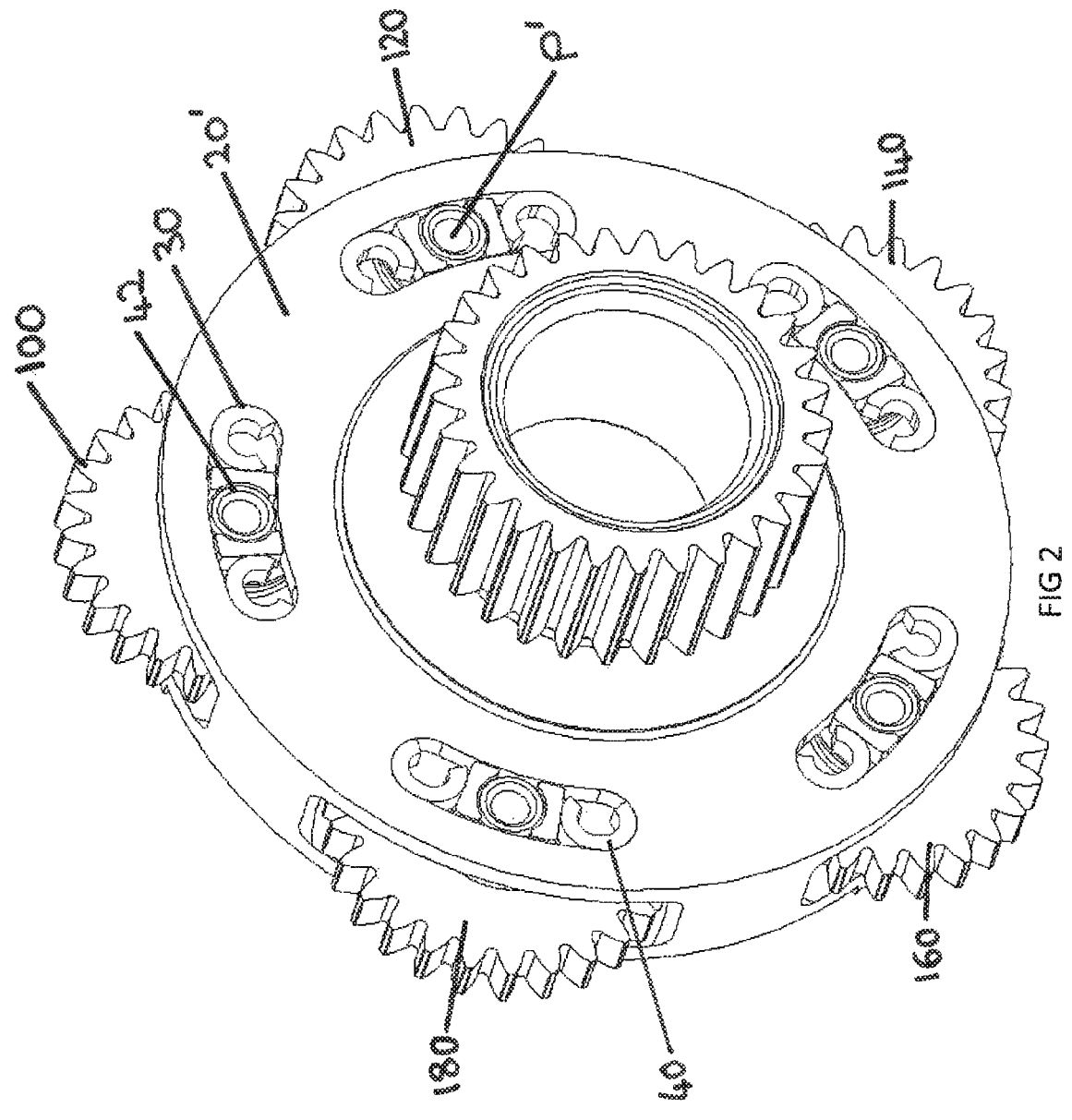
FIG. 2 shows an example of a planetary gear carrier according to the disclosure.

In the example shown in FIG. 2, the resilient element 40 comprises a pair of C-shaped resilient members or spring members, one located on each side of the pin P' in the respective slot 30, 300. To provide a flat contact surface between the resilient elements and the pin, blocks 42 may be located either side of the pin, in the slot 30, 300.

Means may be provided to secure the resilient members in place in the slot 30, 300. Various securing means are envisaged, for example, but not only, a groove within the slot wall and/or the blocks 42. If, during operation or assembly of the transmission assembly a greater load is exerted on one side of the planetary gear, or there is a temperature differential across the planetary gear, thus providing a greater force against the pin P' on one side, the effect will be to force the pin P' towards the other end of the slot from the centre or desired position. This will result in compression of the spring member between the pin and the end of the slot towards which it is pushed and the spring force of that spring member will then act against the force to balance/equally share the load across all planets within the arrangement. As mentioned above, although the examples shown have resilient members for each planetary gear, balancing of the assembly can still be attained if only some of the planetary gears have such a balancing arrangement.

In addition to keeping the planetary gear pin at the desired position, the resilient members also provide a degree of compliance for damping/shock absorption, suspension and reducing backlash.

FIGS. 3 to 7 show examples of some features of the example having C-shaped springs.

Figure 3:
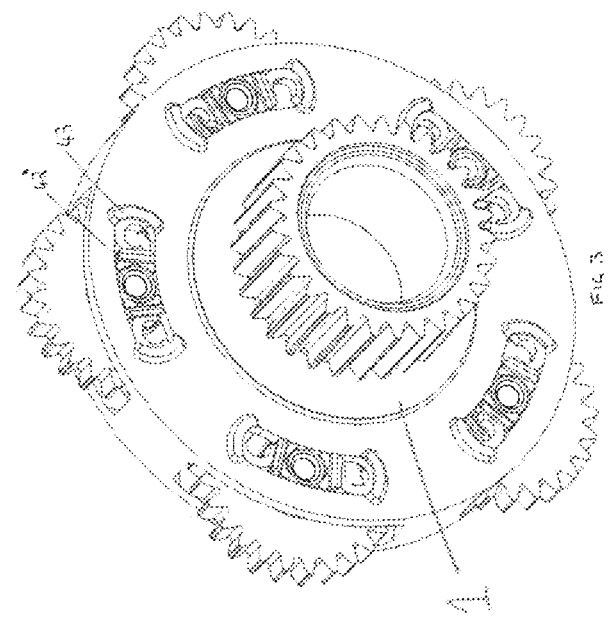
FIG. 3 shows a variation of the example of FIG. 2.

FIG. 3, for example, shows an alternative arrangement for securing the C-shaped springs in which curved blocks 43 are provided at each end of the slot, in addition to blocks 42' between the resilient member and the pin.

Figure 4:
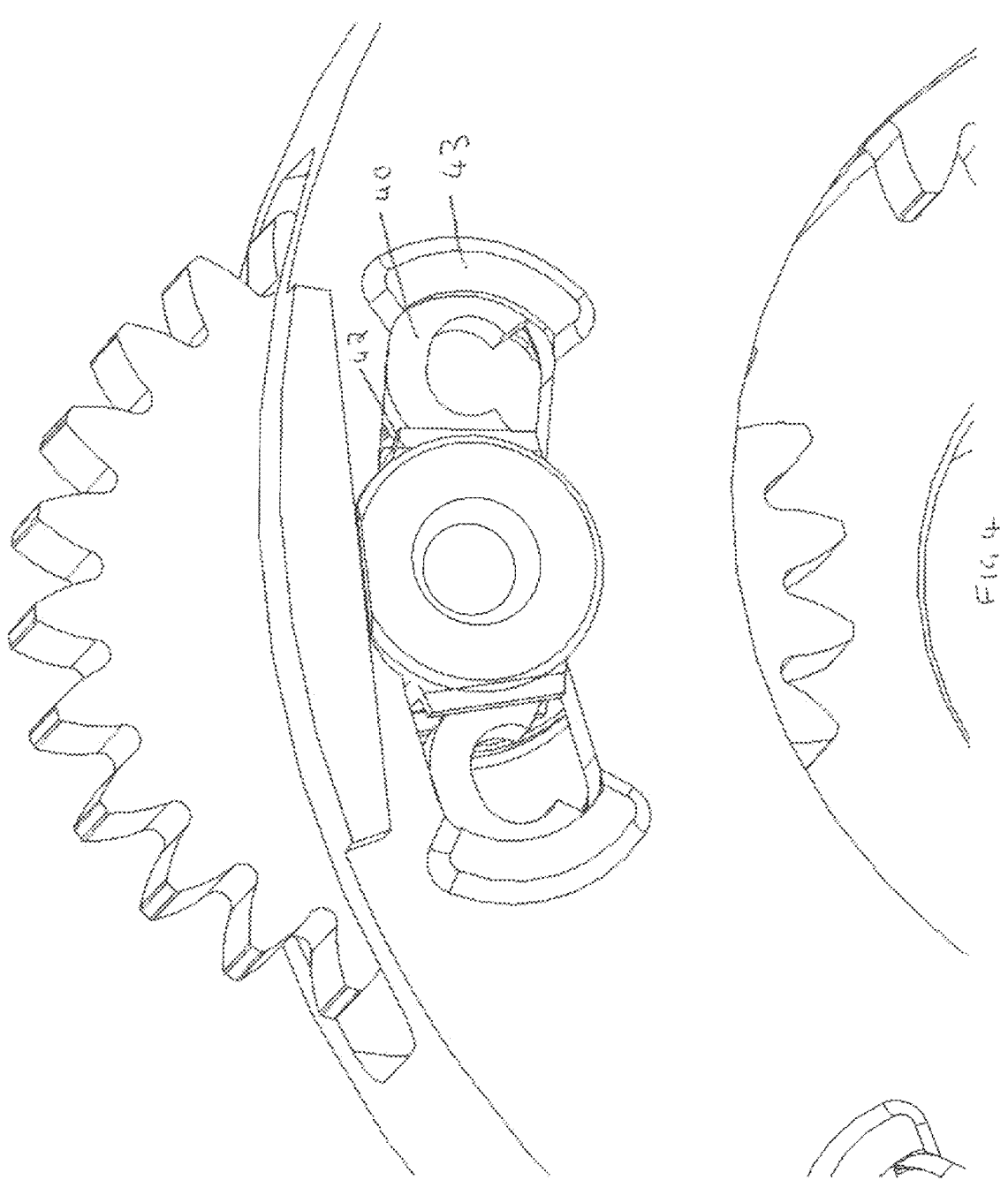
FIG. 4 is a close up view of the example shown in FIG. 3.

As seen in the example of FIG. 4, the curved blocks 43 and the straight blocks 42' have slots therein to receive the resilient members (here, C-shaped springs 40).

Figure 5:
FIG. 5 is a variation on the example of FIG. 4.

The straight blocks 42' may be a single block with a groove as shown in FIG. 4 or may comprise a block body to which a grooved body 42" is attached to receive the spring, as shown in FIG. 5.

Figure 6:
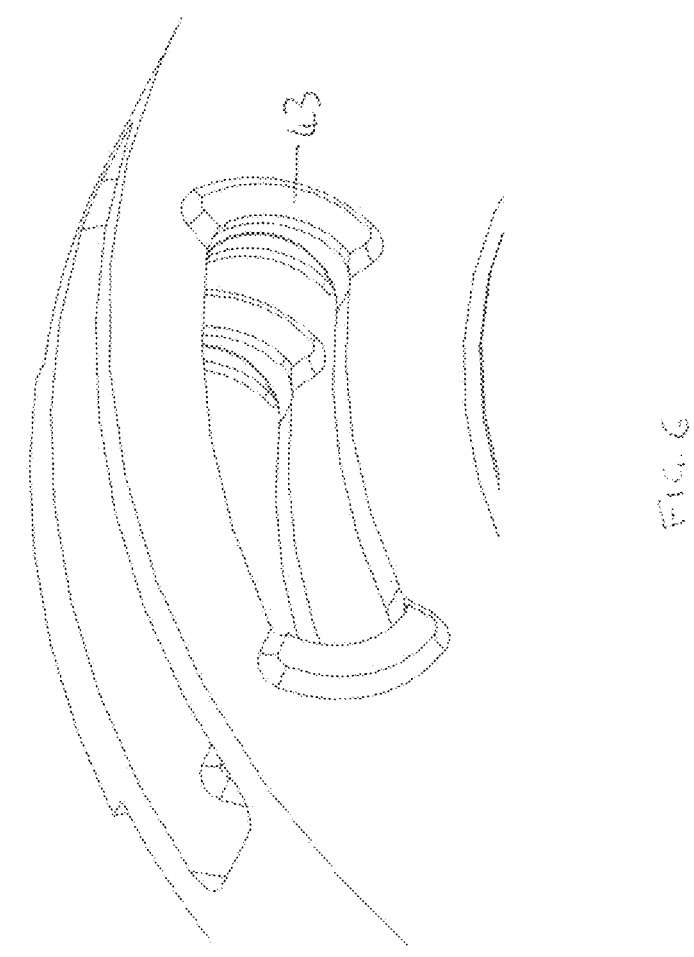
FIG. 6 is a detailed view of the slot of the examples of FIGS. 3, 4 and 5.

FIG. 6 shows, in more detail, an example of the curved blocks 43 fitted at the ends of the slot.

Figure 7:
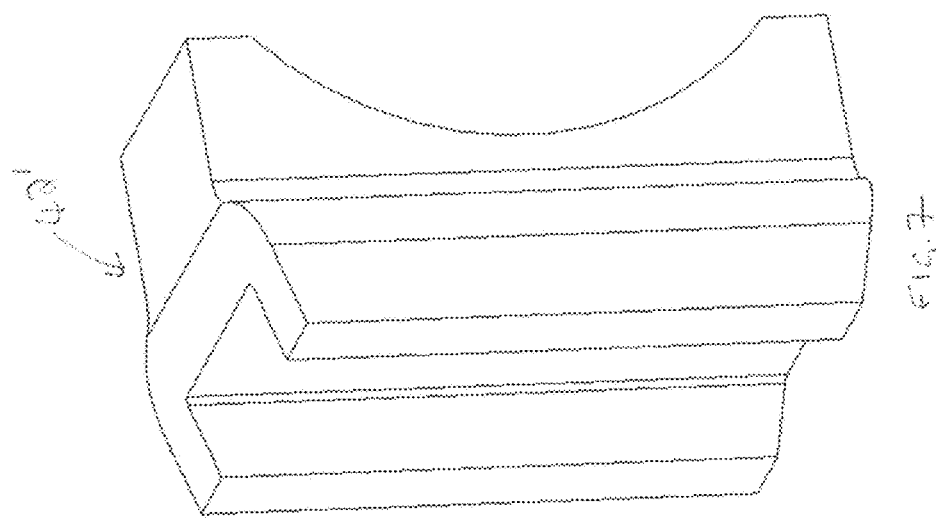
FIG. 7 is a detailed view of securing blocks that may be used in the examples of FIGS. 3, 4 and 5.

FIG. 7 shows an example of the inner' 'straight' block 42' such as shown in FIG. 5.

Figure 8:
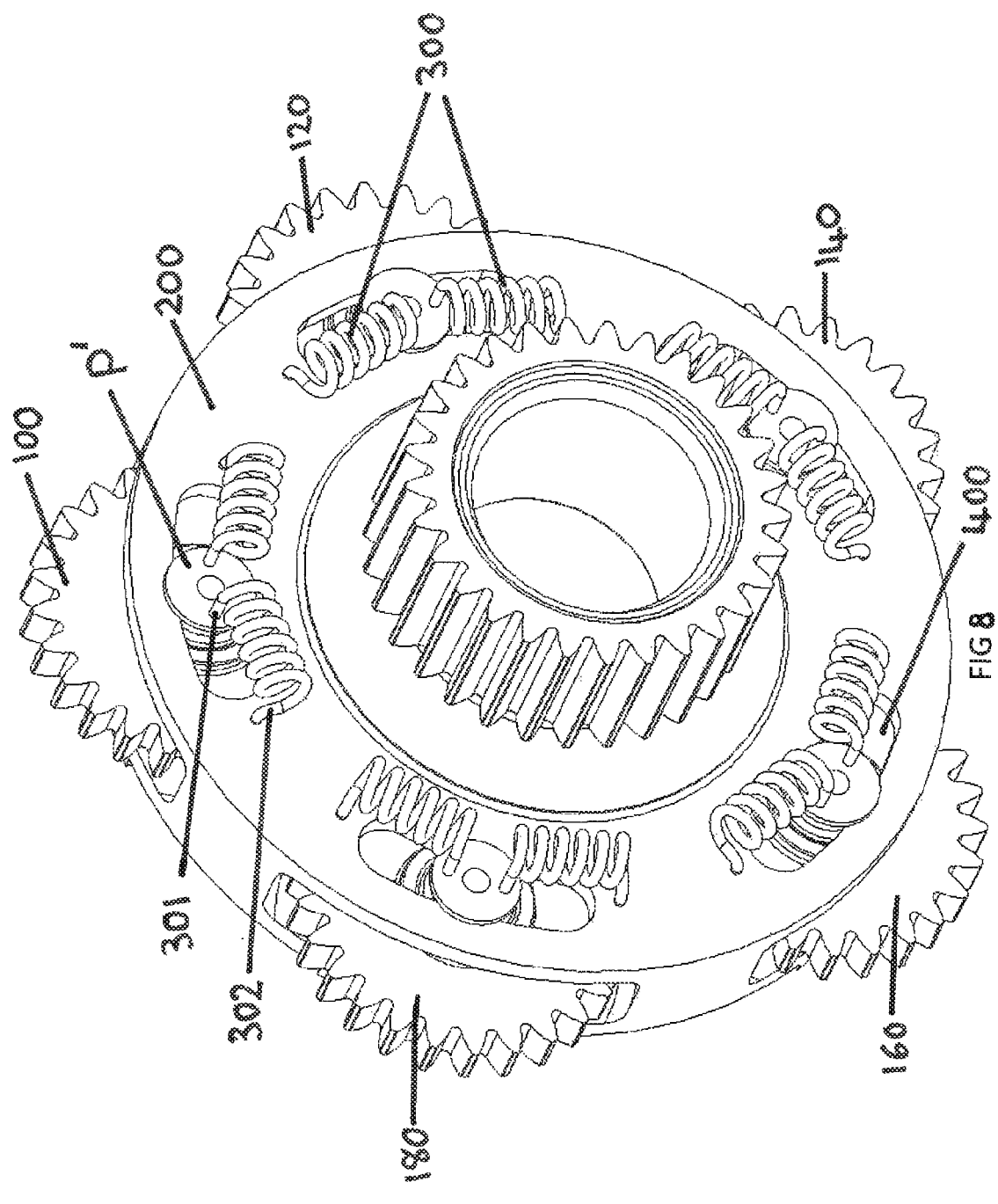
FIG. 8 shows an alternative example of a planetary gear carrier according to the disclosure.

In another example, such as shown in FIG. 8, the resilient elements 400 comprise springs e.g. compression springs which may extend from the pin P' to the carrier 200. For example, the springs may be attached, at one end 401, to the pin P' or a support block around the pin, and, at the other end 402, to the carrier. As with the example of FIG. 2, the pin P' is mounted within a slot 300 formed within the carrier, within which the pin P' (and, hence, the planetary gear) can move circumferentially relative to the carrier 200 responsive to the force of the springs 400. As with the example shown in FIG. 2, as one spring, on one side of the slot, becomes more compressed due to uneven loading/temperature on the planetary gear, the force of the spring pushes the pin P' back towards the centre/desired position in the slot/relative to the carrier and the sun gear.

The C-shaped springs 40 of FIGS. 2 to 7 and the compression springs 400 of FIG. 8 are but two examples of resilient elements that can cause circumferential adjustment of the position of the planetary gears relative to the carrier dependent on the distribution of load on the planetary gears. Other resilient elements are also possible.

The resilient load-sharing epicyclic carrier of this disclosure allows equal and balanced load sharing across multiple planetary gears within a fixed carrier planetary system. The system is able to self-adjust for load and temperature variations. As the system does not need to be designed to account for uneven loading, this solution increases the load-carrying capability of the system, while reducing cost, envelope and weight of a multi-planetary system. In addition, the arrangement provides damping against shock loading.

The invention claimed is:

1. A planetary gear carrier assembly comprising:
   a plurality of planetary gears each rotatable about a respective planet axis defined by a respective pin through the gear;
   a planetary gear carrier having:
      a front face and a back face defining a housing therebetween, wherein at least a portion of the housing is an annular housing; and
      an annulus axis, wherein the plurality of planetary gears are located within and spaced circumferentially around the housing, the respective pin of each planetary gear passing from the front face to the back face at a location such that the planetary gear partially extends radially outwards of a periphery of the planetary gear carrier; and a position balancing arrangement for at least one of the plurality of planetary gears, the position balancing arrangement comprising:

a slot formed in the front face and back face, extending circumferentially to receive the respective pin of the at least one of the planetary gears for circumferential movement within the slot;

a first resilient element in biased engagement with the respective pin to adjust a position of the respective pin in the slot towards a desired position responsive to movement of the respective pin away from the desired position in the slot;

a second resilient element in biased engagement with the respective pin to adjust the position of the respective pin in the slot towards the desired position responsive to movement of the respective pin away from the desired position in the slot;

a first holding block in the slot and between the first resilient element and the respective pin; and a second holding block in the slot and between the second resilient element and the respective pin.

2. The planetary gear carrier assembly of claim 1, wherein the position balancing arrangement is for two or more of the plurality of planetary gears.

3. The planetary gear carrier assembly of claim 2, wherein the position balancing arrangement is for each of the plurality of planetary gears.

4. The planetary gear carrier assembly of claim 1, wherein each of the first and second resilient elements comprises a respective spring element configured to bias the pin to a central location within the slot.

5. The planetary gear carrier assembly of claim 4, wherein each of the respective spring elements comprises a respective C-shaped spring located in the slot on opposite sides of the pin.

6. The planetary gear carrier assembly of claim 5, further comprising securing means for locating each of the respective C-shaped springs in the slot.

7. The planetary gear carrier assembly of claim 6, further comprising a curved block at each end of the slot within which each of the respective spring elements is secured.

8. The planetary gear carrier assembly of claim 4, wherein the holding block has a groove on its radially inner surface to receive each of the respective spring elements.

9. The planetary gear carrier assembly of claim 8, further comprising a curved block at each end of the slot within which each of the respective spring elements is secured.

10. The planetary gear carrier assembly of claim 4, further comprising a curved block at each end of the slot within which each of the respective spring elements is secured.

11. The planetary gear carrier assembly of claim 4, wherein each of the respective spring elements comprises a respective compression spring arranged to bias the pin to the central location within the slot.

12. The planetary gear carrier assembly of claim 11, wherein each of the respective compression springs have a first end attached to the pin and a second end attached to the carrier at a respective end of the slot.

13. An epicyclic gear assembly comprising:

a sun gear; and a planetary gear carrier assembly as claimed in claim 1, the sun gear located coaxially with the carrier and radially inwards of the planetary gears for meshing engagement with the planetary gears.

14. A planetary gear carrier assembly comprising:

a plurality of planetary gears each rotatable about a respective planet axis defined by a respective pin through the gear;

a planetary gear carrier having:

a front face and a back face defining a housing therebetween, wherein at least a portion of the housing is an annular housing; and an annulus axis, wherein the plurality of planetary gears are located within and spaced circumferentially around the housing, the respective pin of each planetary gear passing from the front face to the back face at a location such that the planetary gear partially extends radially outwards of a periphery of the planetary gear carrier and a position balancing arrangement for at least one of the plurality of planetary gears, the position balancing arrangement comprising:

a slot formed in the front face and back face, extending circumferentially to receive the respective pin of the at least one of the planetary gears for circumferential movement within the slot;

a first resilient element in biased engagement with the respective pin to adjust a position of the respective pin in the slot towards a desired position responsive to movement of the respective pin away from the desired position in the slot, wherein the resilient element comprises a spring element configured to bias the pin to a central location within the slot; and a curved block at each end of the slot within which a respective spring element is secured.

15. The planetary gear carrier assembly of claim 14, wherein the curved block has a groove formed therein to receive the spring element.

16. A planetary gear carrier assembly comprising:

a plurality of planetary gears each rotatable about a respective planet axis defined by a respective pin through the gear;

a planetary gear carrier having:

a front face and a back face defining a housing therebetween, wherein at least a portion of the housing is an annular housing; and an annulus axis, wherein the plurality of planetary gears are located within and spaced circumferentially around the housing, the respective pin of each planetary gear passing from the front face to the back face at a location such that the planetary gear partially extends radially outwards of a periphery of the planetary gear carrier and a position balancing arrangement for at least one of the plurality of planetary gears, the position balancing arrangement comprising:

a slot formed in the front face and back face, extending circumferentially to receive the respective pin of the at least one of the planetary gears for circumferential movement within the slot;

a resilient element in biased engagement with the respective pin to adjust a position of the respective pin in the slot towards a desired position responsive to movement of the respective pin away from the desired position in the slot; and a holding block in the slot and between the first resilient element and the respective pin, wherein the holding block comprises a flat surface that abuts the resilient element, and wherein the holding block abuts the respective pin.

17. The planetary gear carrier assembly of claim 16, wherein the resilient element abuts the slot.

18. The planetary gear carrier assembly of claim 17, wherein the resilient element comprises a spring element configured to bias the pin to a central location within the slot.

19. The planetary gear carrier assembly of claim 18, wherein the spring element comprises a pair of respective C-shaped springs located in the slot on opposite sides of the pin.

20. The planetary gear carrier assembly of claim 18, and further comprising a curved block at each end of the slot within which the spring element is secured.

* * * * *